(12) United States Patent
Mansutti et al.

(10) Patent No.: US 7,885,284 B2
(45) Date of Patent: Feb. 8, 2011

(54) MESSAGE-BASED COMMUNICATIONS

(75) Inventors: David Mansutti, Valbonne (FR); Bruno Menez, Antibes (FR); Marie-Noelle Mathieu, Vence (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 11/587,570

(22) PCT Filed: May 13, 2005

(86) PCT No.: PCT/EP2005/052209

§ 371 (c)(1),
(2), (4) Date: Dec. 6, 2006

(87) PCT Pub. No.: WO2005/112387

PCT Pub. Date: Nov. 24, 2005

(65) Prior Publication Data

US 2007/0171907 A1     Jul. 26, 2007

(30) Foreign Application Priority Data

May 17, 2004   (EP) .................................. 04300284

(51) Int. Cl.
    *H04L 12/54* (2006.01)
(52) U.S. Cl. ...................................................... 370/428
(58) Field of Classification Search ................. 370/351, 370/389, 392, 393, 395.1, 395.3, 400, 410, 370/464, 498, 522, 412, 428, 429
See application file for complete search history.

(56) References Cited

U.S. PATENT DOCUMENTS

| 6,678,264 B1 * | 1/2004 | Gibson ........................ 370/352 |
| 2004/0249891 A1 * | 12/2004 | Khartabil et al. ............. 709/206 |
| 2005/0154872 A1 * | 7/2005 | McGrew ....................... 713/150 |
| 2005/0202836 A1 * | 9/2005 | Schaedler et al. ............ 455/466 |
| 2007/0142029 A1 * | 6/2007 | Willehadson et al. ........ 455/405 |

OTHER PUBLICATIONS

Camarillo, "Compressing the Session Initiation Protocol (SIP)," IETF Network Working Group, Request for Comment 3486, No. RFC3486, Feb. 2003, 10 Sheets.

* cited by examiner

*Primary Examiner*—Kwang B Yao
*Assistant Examiner*—Obaidul Huq

(57) ABSTRACT

A method of communicating information between an intermediate element and a source element in a message-based communications system is provided where request and response messages being are sent via an intermediate element arranged to forward the messages to the appropriate element The method includes, at the intermediate element: prior to forwarding a received request message: determining the presence, in the received request message, of an indication of the information to be communicated and where present, adding a temporary identifier associated with the intermediate element to the message in such a way that the temporary identifier is included in the corresponding response message; and prior to forwarding a received response message: determining the presence of a temporary identifier associated with the intermediate element and, where present, replacing the temporary identifier with the information to be communicated to the source element.

22 Claims, 3 Drawing Sheets

FIGURE 1A
PRIOR ART
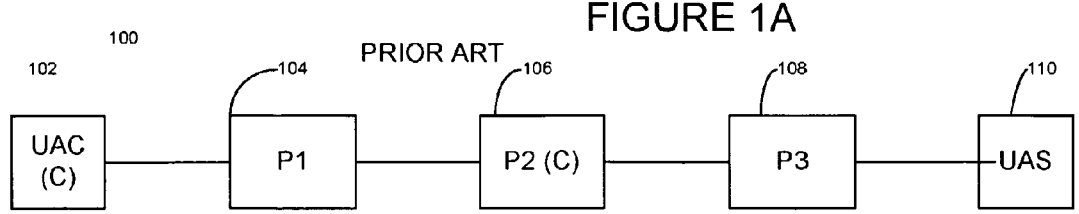
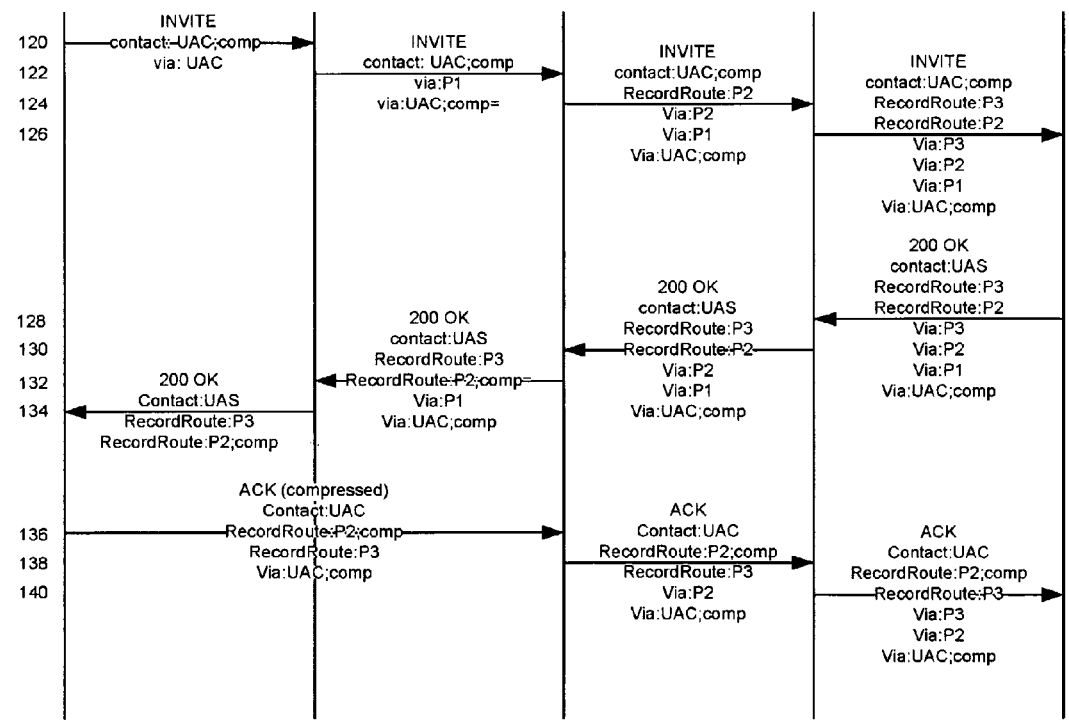
FIGURE 1B

FIGURE 2A
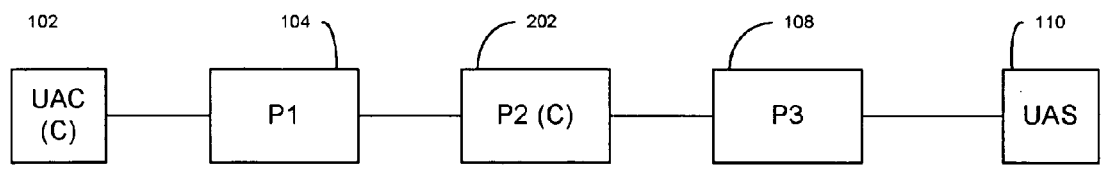
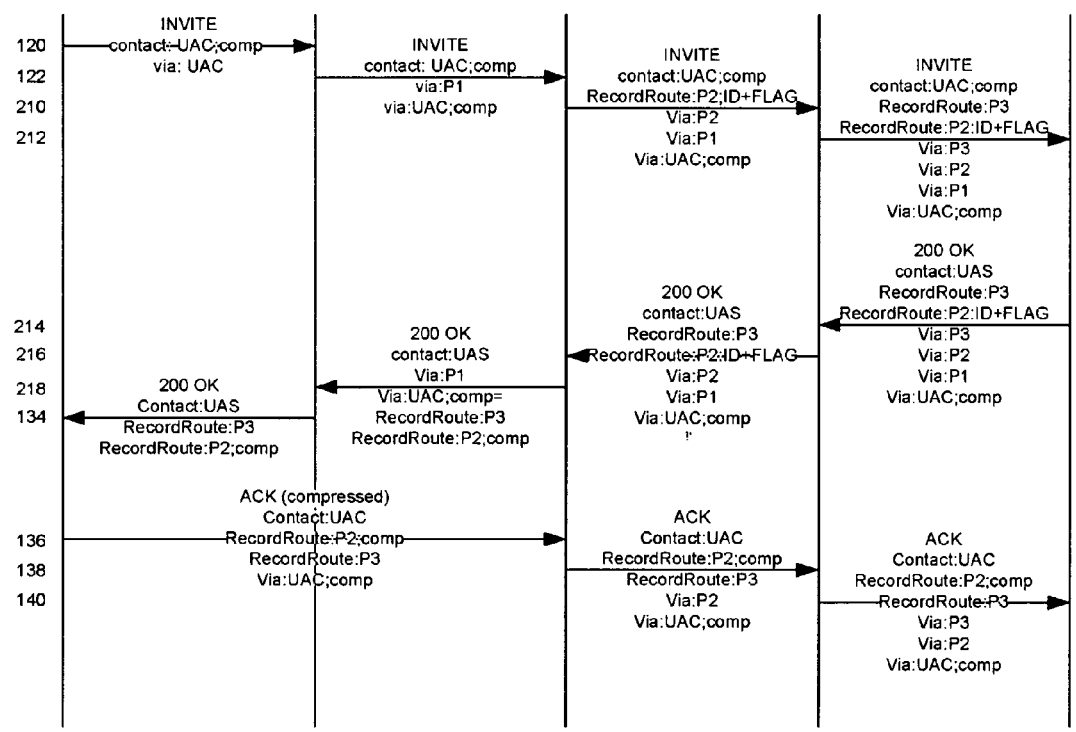
FIGURE 2B

MESSAGE-BASED COMMUNICATIONS

The present invention relates generally to the field of communications protocols and systems and, more particularly, to message-based communications in which messages are communicated between end points via one or more intermediate element.

Many communication systems use a request-response message-based communications protocol for communicating between a source element and a destination element. Often request and response messages are sent via an intermediate element which forwards received messages to the appropriate destination element.

Session Initiation Protocol (SIP) is one example of such a communications protocol and which is defined in Request for Comments (RFC) 3261 as an application-layer control and signaling protocol for establishing, modifying, and terminating real-time calls and conferences over, primarily, Internet protocol (IP) networks. These actions are effected by sending requests and receiving responses, in the form of SIP messages, from one SIP element to another.

In some circumstances it may be necessary for an intermediate element to communicate information to a source element, however there may not exist any direct two-way communication path between an intermediate element and a source element. In such cases, the only way for an intermediate element to communicate information with a source element is to wait for a response message to be sent from the destination element, and which is also sent via the intermediate element, and to add the information to be communicated to the response message. Where an intermediate element receives messages from multiple source and destination elements a mechanism is additionally required to enable the intermediate element to determine which response messages are associated with which request messages. In SIP such a situation arises with use of SIP message compression, in which the information to be communicated relates to message compression, as defined in RFC 3486. RFC 3486 describes how SIP messages may be compressed and provides a parameter which can be added to a SIP message to indicate whether an element supports the SIP compression.

For example, a SIP request message sent from a source element to a destination element via an intermediate element may contain information indicating that the source element supports SIP compression. If the intermediate element also supports compression, then information may need to be communicated back to the source element in order to allow future communications between the source and the intermediate element to take place using compression. The intermediate element achieves this by, upon receiving a corresponding response message sent by the destination element to the source element, inserting information in the message for indicating to the source element that the intermediate element also supports compression.

Since an intermediate element, such as a SIP proxy, will typically receive messages from multiple destinations a context database needs to be maintained to enable the intermediate element to pair up corresponding request and response messages forming part of the same transaction. Such techniques, for example as described in RFC 3486, require intermediate elements, such as proxy servers, in the message path to locally store dialog or transaction context information—in other words, the currently proposed techniques require use of stateful elements.

Stateful elements require the provision of additional storage capacity, databases, look-up routines, garbage collection routines and the like, which use up valuable processing resources and typically increase the cost and development times of such devices. In SIP, for example, compression enabled proxy servers are often located at the gateway between fixed and wireless networks and are generally critical network elements requiring both high performance and high availability.

As will be appreciated by those skilled in the art, the requirement to make an element highly available, especially where large amounts of context data needs to be preserved, is difficult and costly. Furthermore, the provision of high-availability mechanisms typically leads to some reduction in performance, which is particularly undesirable in telecommunications applications, for example, where the number of simultaneous calls which may be handled by an element, and which is often a significant distinguishing factor between competitor products, is directly related to the performance of the system.

Accordingly, one aim of the present invention is to mitigate at least some of the above-mentioned problems.

According to a first aspect of the present invention, there is provided a method of communicating information between an intermediate element and a source element in a message-based communications system in which a request message is sent from the source element to a destination element and in response to which a corresponding response message is sent from the destination element to the source element, the request and response messages being sent via an intermediate element arranged to forward the messages to the appropriate element. The method comprises, at the intermediate element, and prior to forwarding a received request message of determining the presence, in the received request message, of an indication of the information to be communicated and where present, adding a temporary identifier associated with the intermediate element to the message in such a way that the temporary identifier is included in the corresponding response message. Prior to forwarding a received response message the method comprises: determining the presence of a temporary identifier associated with the intermediate element and, where present, replacing the temporary identifier with the information to be communicated to the source element.

Advantageously this removes the need to store message related context information and thus removes the need for associated database lookup routines, garbage collection routines and the like.

Suitably the temporary identifier is unambiguous within the system.

Suitably the step of adding the temporary identifier further comprises adding additional information for identifying the type of information to be communicated to the source element.

The message-based communication system may be a session initiation protocol (SIP) based system, wherein the intermediate element is a SIP proxy server, in which case the request message may be a SIP request message, and wherein the response message may be a SIP response message. In this case, the step of determining the presence in the received request message further comprises determining the presence of a SIP compression parameter.

The request message suitably includes the URI of the SIP proxy, and then the step of adding the temporary identifier further comprises adding the temporary identifier to the URI of the SIP proxy.

Suitably the step of determining the presence of the temporary identifier in a response message further comprises determining the presence of the temporary identifier in the URI of the SIP proxy within the response message.

Preferably the step of replacing the temporary identifier further comprises replacing the temporary identifier with a SIP compression parameter.

Suitably future request messages from the source element to the SIP proxy are sent using compression where the SIP proxy has previously indicated to the source element that the proxy supports SIP compression.

According to a second aspect of the present invention there is provided an intermediate element adapted for operating in accordance with any of the above described method steps.

According to a third aspect of the present invention there is provided a SIP proxy adapted for operating in accordance with any of the above described method steps.

According to a fourth aspect, there is provided apparatus for forwarding messages in a message-based communications system in which a request message is sent from a source element to a destination element and in response to which a response message is sent from the source element to the destination element, the system being arranged such that messages are sent via the apparatus for forwarding to their appropriate destination, comprising means for, prior to forwarding a received request message, determining in the received request message the presence of an indication of the information to be communicated, said means being arranged for, where the presence of the indication is determined, adding a temporary identifier associated with the intermediate element to the message in such a way that the temporary identifier is included in the corresponding response message; and means for, prior to forwarding a received response message, determining in the received response message the presence of a temporary identifier associated with the intermediate element, said means being arranged for, where the presence of the temporary identifier is determined, replacing the temporary identifier with the information to be communicated to the source element.

An embodiment of the present invention will now be described, by way of example only, with reference to the accompanying diagrams, in which:

FIG. 1A is a block diagram showing a SIP network according to the prior art;

FIG. 1B is a message flow diagram outlining a typical message flow between the different network elements of the network shown in FIG. 1A;

FIG. 2A is a block diagram showing a SIP network including a SIP proxy server according to an embodiment of the present invention;

FIG. 2B is a message flow diagram outlining a message flow between the different network elements of the network shown in FIG. 2B.

Figure 3:
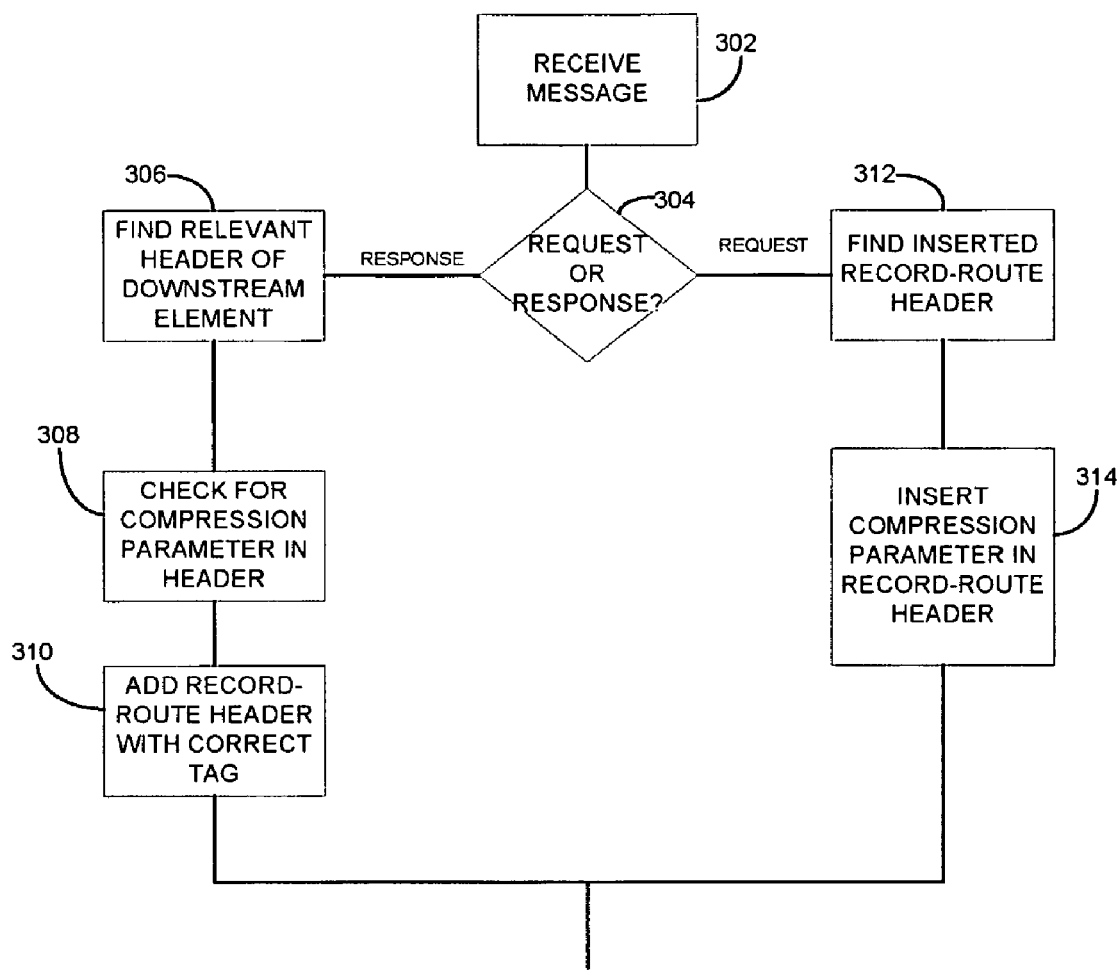
FIG. 3 is a flow diagram outlining example processing steps performed by a SIP proxy server in accordance with an embodiment of the present invention.

The following description is made with reference to session initiation protocol (SIP) networks. However, it will be understood by those skilled in the art that the inventive concepts described herein are in no way limited to SIP, and may be used, with appropriate modification as required, with other communications protocols having similar characteristics.

FIG. 1A shows a block diagram of a typical SIP network 100 according to the prior art. The SIP network comprises a number of network elements, namely a SIP user agent client (UAC) 102, a SIP user agent server (UAS) 110, and a number of intermediate elements, such as SIP proxy servers, 104, 106 and 108. The UAC 102 may establish a call, for example, with the UAS 110 by sending a request message, such as an INVITE message, to the UAS 110. The UAS may respond with a response message, such as a 200 OK message, as is described in further detail below. As will be appreciated by those skilled in the art, additional messages may also be sent in order to complete the call set-up.

In SIP, such an exchange of messages is known as a transaction, with a transaction comprising all messages from the first request message sent from a server up to a final (non-1xx) response message sent from the server back to the client. A SIP call is defined as comprising all messages from an initial INVITE message up to a BYE message. A SIP call may comprise multiple transactions.

The proxy servers 104, 106, and 108 are used to route messages, in a known manner. In this example, the UAC 102 and the proxy server 106 support SIP message compression according to RFC 3486, whilst the other network elements do not.

Referring now to FIG. 1B, there is shown a message flow diagram showing the initial messages involved in setting up a call between the UAC 102 and the UAS 110. Those skilled in the art will appreciate that additional messages may also be involved in a call set-up. For clarity the messages shown in FIG. 1B are shown in abbreviated form and show only some of the available SIP message headers.

The UAC 102 sends a SIP INVITE message 120 to the UAS 110. The INVITE message 120 is initially sent to a proxy server 104 the address of which is preconfigured in the UAC 102. The Contact header of the INVITE message 120 contains the universal resource indicator (URI) of the UAC 102. As previously mentioned, the UAC 102 supports SIP message compression so, in accordance with RFC 3486, the UAC 102 adds the parameter comp=sigcomp to its URI in the Contact header. The value which comp may take indicates the type of compression scheme to be used. Hereinafter it is assumed that the Signaling Compression (SigComp) scheme defined in RFC 3320 is used, however the actual compression mechanisms are outside of the scope of the present invention and will not be discussed further. For clarity, hereinafter the shorthand notation comp is used in place of the longhand notation comp=sigcomp. The presence of the comp parameter in the URI of the SIP message header is used to indicate both that a particular element supports compression and that that element wishes to receive future messages in compressed format, where possible.

It is also possible for the UAC 102 to be preconfigured to send initial messages in compressed form if the UAC 102 knows that the proxy 104 also supports compression.

Since the UAC 102 does not know, at this stage at least, whether any other elements in the SIP network support SIP message compression the UAC 102 initially sends messages uncompressed, after having added a Via header to the message 120 with the URI of the UAC 102.

SIP proxy 104, which does not support SIP compression and is thus stateless, receives the INVITE message 120 and forwards the message, after having added its URI to the list of Via headers, to the SIP proxy 106.

SIP proxy 106, which supports SIP compression, receives the INVITE message 122. The proxy 106 is configured to stay in the path of future requests in the same SIP dialog and achieves this by adding a RECORD-ROUTE header containing its URI to the message. Since the proxy 106 supports compression it stores information in a transaction context data store. The type of information stored includes the Contact URI, unique call identification, and other information which can be used by the proxy to match up the current request with an eventual response message. Additional information is stored to indicate whether compression should be used when communicating with different SIP elements. Proxy 202 is thus said to be a stateful proxy. Finally, the proxy 106 adds its URI to the list of Via headers, and forwards the message 124 uncompressed to the SIP proxy 108, since again proxy 106 does not initially know if proxy 108 supports compression.

SIP proxy 108, which in this example does not support compression and is thus stateless, receives the INVITE message 124 and, as it too wishes to stay in the path for future requests in the same dialog, adds a RECORD-ROUTE header containing its URI to the message and adds its URI to the top of the list of Via headers. The message is sent to UAS 110 uncompressed since the proxy 108 does not know if the UAS supports SIP compression.

The UAS 110 receives and processes the message 126 in the usual manner. Since the INVITE message is the first message of a call, the UAS 110 constructs and stores a 'route set' as part of the current call context. A route set is a collection of ordered URIs which identifies a chain of servers through which new requests outside the current dialog should be sent. A route set can be learned, through headers like Record-Route, or it can be configured. For UAS 110 the route set is obtained from the header information of the message 126 and comprises:

Route Set:
    P3
    P2
    UAC;comp

Thus new requests within the same call sent from the UAS 110 to the UAC 102 will be sent via the route provided in the route set. However, this only applies for new requests, and not for messages sent in response to prior requests.

The UAS 110 responds to the received INVITE message by sending a response 200 OK message 128 back to the UAC 102. SIP requires that response messages follow the same path taken by corresponding request messages, and this is assured by sending the response 128 to the next hop address indicated in the top of the Via list of message 128, in this case the proxy 108. Since UAS 110 does not support compression the message is sent in uncompressed form.

The proxy 108 receives the message 128, removes it's URI from the list of Via headers and forwards the message 130 uncompressed to the proxy 106.

When the proxy 106, which is a stateful proxy, receives the response message 130 the proxy determines whether the received message is part of the current transaction. This can be achieved, for example, by matching a transaction identifier for the current message with the information stored in the transaction context. If the message is part of the current transaction, the proxy then analyzes the received message to determine whether it record-routed. The term record-routed is used herein, as well as in the SIP specification, to refer to a SIP element that has previously inserted a Record-Route header into a SIP message within the same transaction.

If the proxy 106 did record-route the proxy inspects the route which is set for this dialog. The route comprises in this case: UAS 102, proxy 108, proxy 106 and UAC 102. The proxy 104 is not included in the route since it did not Record-Route. The proxy 106 checks the next downstream element in the route (in this case the UAC 102), to determine whether it supports compression. This may be achieved by determining whether the compression parameter is present in the URI of the UAC 102.

Since the URI of the UAC 102 in the Contact header of message 130 contains the comp parameter, thereby indicating that the UAC supports SIP compression requests, the proxy 106 adds its own compression parameter to an appropriate part of the message. In this case this is achieved by modifying its Record-Route header of message 132 to include the comp parameter.

When the UAC receives the message 134, the UAC constructs a route set through the header information contained in the received message, the route set comprising:

Route Set:
    P2;comp
    P3
    UAS

The fact that the route set entry for proxy 106 includes the compression parameter enables the UAC to send further requests within the same dialog in compressed format, as will be seen below.

The UAC 102, processes the received message 134 and responds by sending an ACK message back to the UAS 110. RFC 3261 specifies that an ACK message forms part of a new transaction, and therefore it does not have to follow the same path as the initial INVITE message, and thus the ACK is sent directly to the proxy 106 in compressed format.

The proxy 106 forwards the message in uncompressed format to proxy 108, which in turn forwards the message to the UAS 110, in the normal manner.

Thus it can be seen that in order to implement SIP message compression in the prior art requires a transaction context data store to be maintained in each proxy which supports SIP compression. Additionally, a proxy must also determine, by analyzing message headers, whether another element in the response path supports compression. Furthermore, since a SIP proxy server which supports compression must be transaction stateful, the resource requirements in the SIP proxy are directly proportional to the number of simultaneous established transactions being handled by the same system.

An embodiment according to the present invention which enables a SIP proxy server supporting compression to be stateless will now be described, with reference to FIG. 2.

FIG. 2A represents a similar SIP network and message flow to that shown in FIG. 1A and like features and messages have been given the same numerical identifiers. The SIP network comprises a SIP user agent client (UAC) 102, three SIP proxy servers 104, 202 and 108 respectively, and a SIP user agent server (UAS) 110. The proxy server 202 will be described in more detail below.

FIG. 2B shows a message flow diagram outlining the message flow of a SIP transaction involving various elements of a SIP network, including a SIP proxy 202 according to an embodiment of the present invention.

The transaction starts with the UAC 102 sending an INVITE message 120 to a UAS 110 via a SIP network comprising the proxy servers 104, 202 and 108.

The message 120 is initially sent to a proxy server 104 the address of which is preconfigured in the UAC 102. The Contact header of the INVITE message 120 contains the URI of the UAC 102. In this example, the UAC 102 supports SIP message compression so the UAC 102 adds the parameter comp to its URI in the Contact header.

The UAC 102 set the Via header of the message 120 to the URI of the UAC 102. Since the UAC does not, at this stage, know whether the proxy 104 supports compression, the message 120 is sent uncompressed.

SIP proxy 104, which does not support SIP compression and is thus stateless, receives the INVITE message 120 and forwards the message, after having added its URI to the list of Via headers, to the SIP proxy 202.

SIP proxy 202, which supports SIP compression, receives the INVITE message 122. Proxy 202 is configured to stay in the path of future requests in the same SIP dialog and so adds a RECORD-ROUTE header containing its URI to the message. However, unlike the proxy 106 as described above, proxy 202 is stateless—in other words it does not maintain a transaction context and therefore does not require any context storage means. The operation of proxy 202 is described below with reference to FIG. 3.

When a message is received by the proxy 202 (step 302) the proxy determines (step 304) whether the message is a request or a response message. If, as in this case, the received message is a request message, the proxy finds the Record-Route header (that the proxy 202 just added to the message) (step 312) containing its URI in the message, and adds (step 314) a new compression parameter thereto. The new compression parameter comprises an identifier to unambiguously identify the proxy 202, and a compression flag indicating whether or not futures requests should be compressed. The unambiguous identifier may be derived in a number of different ways, which will be apparent to those skilled in the art.

The value of the flag is determined by the proxy 202 in the following manner. The proxy 202 analyses the received message to determine whether the next upstream element supports SIP compression. The next upstream (i.e. towards to the UAC) element may be determined by first determining the presence of the top-most record-route header (if any exists) in the message, since if any element has record-routed any new request messages will automatically go through the element which record-routed. If there is no record-route header this implies that the next upstream element is that defined by the Contact header of the received message. Once the URI of the next upstream element has been established, the proxy 202 analyses the URI thereof to determine the presence of the comp parameter. If the comp parameter is present, this indicates that future request messages sent between the next upstream element and the proxy 202 may be sent in compressed form. Accordingly, the proxy 202 sets the value of the flag to indicate that compression should be used, otherwise the flag is set to indicate that compression should not be used. At this point, however, the record-route parameter for the proxy 202 does not contain the comp parameter.

Finally, the proxy 202 adds its URI to the list of Via headers, and forwards the message 210 uncompressed to the SIP proxy 108, since again proxy 106 does not initially know if proxy 108 supports compression.

It should be noted that the unambiguous identifier and the flag are only inserted to the message if the proxy is configured to stay in the path, for example by being configured to add a record-route header.

SIP proxy 108, which does not support compression, receives the INVITE message 210 and, as it too wishes to stay in the path for future requests in the same dialog, adds a RECORD-ROUTE header containing its URI to the message, adds the message details to a transaction context data store and adds its URI to the top of the list of Via headers. The message is sent to UAS 110 uncompressed since the proxy 108 does not know if the UAS supports SIP compression.

The UAS 110 receives and processes the message 212. Since the INVITE message is the first message of a call, the UAS 110 stores a route set as part of the current call context. For UAS 110 the route set is obtained from the header information of the message 126 and comprises:

Route Set:
P3
P2:ID+FLAG
UAC;comp

Thus new requests within the same call sent from the UAS 110 to the UAC 102 will be sent via the route provided in the route set.

The UAS 110 then sends a response 200 OK message 128 back to the UAC 102. As previously mentioned, SIP requires that response messages follow the same path taken by corresponding request messages, and this is assured by sending the response 214 to the next hop address indicated in the top of the Via list of message 214, in this case the proxy 108. Since the next hop address does not contain the comp parameter, the message is sent uncompressed.

The proxy 108 receives the message 214, removes it's URI from the list of Via headers and forwards the message 216 uncompressed to the proxy 202.

When the proxy 202 receives (step 302) the message 216, and referring again to FIG. 3, the proxy determines (step 304) whether the received message 216 is part of a request or a response. In this case, the received message is a response message—in other words the received message is part of a transaction which includes the initial request INVITE message. The proxy 202 therefore examines the message to find the relevant header of the next downstream element in the route (i.e. the UAC) and searches the received message for the presence of its unambiguous identifier mentioned above. Such a search routine can be optimized for speed and efficiency due to the simple nature of the search required.

If the identifier of the proxy 202 is found in the message, the value of the flag is obtained. In this case the flag indicates, as described above, that future request messages should be compressed, and that the next downstream element supports compression. The proxy 202 therefore modifies its Record-Route entry in the message 216 to remove the previously added unambiguous identifier and flag and replaces it with the comp parameter. The modified message 218 is then forwarded to the proxy 104.

Those skilled in the art will be aware that in SIP the notion of 'upstream' and 'downstream' is always taken with reference to the message flow direction of the current request or response.

When the UAC receives the message 134, the UAC constructs a route set through the header information contained in the received message, the route set comprising:

Route Set:
P2;comp
P3
UAS

The UAC 102 processes the received message 134 and responds by sending an ACK message back to the UAS 110. Since proxy 202 has Record-Routed and the Record-Route header indicates that the proxy 202 supports SIP compression, the message 136 is sent directly to the proxy 106 in compressed format. The ACK message 136 is forwarded to the UAS 110 via the proxy 108 in uncompressed format, as shown in messages 138 and 140 respectively.

To summarize SIP compression provides a mechanism by which a source element (such as a UAC) may request that an intermediate element (such as a proxy) indicates to the source element whether the source element may use compression when sending future request messages to the intermediate element. Since SIP only provides a one-way communication path, i.e. either a request or a response, such an indication can only be given in a response message. According to the present embodiment such a mechanism advantageously does not require the use of a stateful intermediate element.

The effect of above process is that the 200 OK message 134 received by the UAC 102 is the identical to that received in the prior art except that, unlike in the prior art which required the use of stateful proxy servers, the present embodiment requires only the use of stateless proxy servers. Thus, SIP proxy servers according to the above-described embodiment may be deployed in SIP networks which require support of SIP message compression, allowing full advantage to be taken of the already-mentioned benefits of using stateless as opposed to stateful proxy servers.

Those skilled in the art will appreciate that the same techniques may also be applied to other SIP elements such as back-to-back user agents (B2BUA)

The invention claimed is:

1. A method of communicating information between an intermediate element and a source element in a message-based communications system wherein a request message is sent from the source element to a destination element and in response a corresponding response message is sent from the destination element to the source element, the request and response messages being sent via the intermediate element configured to forward the messages to an appropriate element, the method comprising, at the intermediate element:
   receiving the request message;
   prior to forwarding the request message:
      determining a presence, in the request message, of an indication of information to be communicated and where present, adding a temporary identifier associated with the intermediate element to the request message such that the temporary identifier is included in the corresponding response message, and avoiding storage of message related context information associated with the request message;
   receiving the response message that is responsive to the request message; and
   prior to forwarding the response message:
      determining a presence of the temporary identifier associated with the intermediate element in the response message and, where present, replacing the temporary identifier with information to be communicated to the source element, wherein the replacing is performed without accessing any stored message related context information associated with the request message.

2. The method of claim 1, wherein the step of adding the temporary identifier further comprises adding an identifier which unambiguously identifies the intermediate element.

3. The method of claim 1, wherein the step of adding the temporary identifier further comprises adding additional information for identifying a type of information to be communicated to the source element.

4. The method of claim 1, wherein the message-based communication system is a session initiation protocol (SIP) based system, wherein the intermediate element is a SIP proxy server, wherein the request message is a SIP request message, wherein the response message is a SIP response message, and wherein the step of determining the presence of the indication in the request message comprises determining a presence of a SIP compression parameter.

5. The method of claim 4, wherein the request message includes a URI of the SIP proxy server, and wherein the step of adding the temporary identifier comprises adding the temporary identifier to a field including the URI of the SIP proxy server.

6. The method of claim 5, wherein the step of determining the presence of the temporary identifier in the response message comprises determining the presence of the temporary identifier in a field including the URI of the SIP proxy server within the response message.

7. An intermediate element adapted for operating in accordance with claim 1.

8. A SIP proxy server adapted for operating in accordance with claim 1.

9. The method of claim 1, wherein the indication specifies that a network element in communication with the intermediate element supports message compression, and wherein replacing the temporary identifier in the response message with the information to be communicated to the source element comprises replacing the temporary identifier with a parameter indicating that the intermediate element supports message compression.

10. The method of claim 9, further comprising:
   in response to determining presence of the indication in the request message, adding a parameter set to a first value to the request message indicating that message compression is to be used.

11. The method of claim 10, further comprising:
   in response to determining that the indication is not present, set the parameter to a second value indicating that message compression is not to be used.

12. A method of communicating information between an intermediate element and a source element in a message-based communications system, wherein the message-based communication system is a session initiation protocol (SIP) based system, and wherein a SIP request message is sent from the source element to a destination element and in response a corresponding SIP response message is sent from the destination element to the source element, the SIP request and response messages being sent via the intermediate element configured to forward the messages to an appropriate element, and wherein the intermediate element is a SIP proxy server, the method comprising, at the SIP proxy server:
   prior to forwarding a received SIP request message:
      determining a presence, in the received SIP request message that includes a URI of the SIP proxy server, of a SIP compression parameter and where present, adding a temporary identifier associated with the SIP proxy server to the received SIP request message in a field that includes the URI of the SIP proxy server such that the temporary identifier is included in the corresponding SIP response message; and
   prior to forwarding a received SIP response message:
      determining a presence of a temporary identifier associated with the SIP proxy server in a field that includes the URI of the SIP proxy server and, where present, replacing the temporary identifier with a SIP compression parameter.

13. The method of claim 12, further comprising sending future request messages from the source element to the SIP proxy server using compression where the SIP proxy server was indicated to the source element as supporting SIP compression using the SIP compressor parameter in the SIP response message forwarded by the SIP proxy server to the source element.

14. An apparatus for forwarding messages in a message-based communications system wherein a request message is sent from a source element to a destination element and in response a response message is sent from the destination element to the source element, the system being arranged such that messages are sent via the apparatus for forwarding to an appropriate destination, comprising:
   a server configured to:
      receive the request message sent by the source element;
      prior to forwarding the request message, determine in the request message a presence of an indication of information to be communicated;
      where the presence of the indication is found, add a temporary identifier associated with the server to the request message such that the temporary identifier is included in the corresponding response message, wherein the server is further arranged to avoid storage of message related context information associated with the request message; and receive the response message sent by the destination element in response to the request message;

prior to forwarding the response message, determine in the response message a presence of the temporary identifier associated with the server; and where the presence of the temporary identifier is found, replace the temporary identifier with information to be communicated to the source element, wherein the replacing is performed without accessing any stored message related context information associated with the request message.

15. The apparatus of claim 14, wherein the temporary identifier unambiguously identifies the intermediate element.

16. The apparatus of claim 14, wherein the message-based communication system is a session initiation protocol (SIP) based system, wherein the server is a SIP proxy server, wherein the request message is a SIP request message, wherein the response message is a SIP response message, and wherein the indication in the request message is a SIP compression parameter.

17. The apparatus of claim 16, wherein the request message includes a URI of the SIP proxy server, and wherein the temporary identifier is added to a field including the URI of the SIP proxy server.

18. The apparatus of claim 17, wherein the temporary identifier in the response message is in a field including the URI of the SIP proxy server within the response message.

19. The apparatus of claim 14, wherein the indication specifies that a network element in communication with the server supports message compression, and wherein the information to be communicated to the source element that replaces the temporary identifier in the response message comprises a parameter indicating that the server supports message compression.

20. The apparatus of claim 19, wherein the server is configured to further:

add a parameter set to a first value to the request message indicating that message compression is to be used, in response to determining presence of the indication in the request message.

21. The apparatus of claim 20, wherein the server is configured to further:

in response to determining that the indication is not present, set the parameter to a second value indicating that message compression is not to be used.

22. An apparatus for forwarding messages in a message-based communications system, wherein the message-based communication system is a session initiation protocol (SIP) based system, and wherein a SIP request message is sent from a source element to a destination element and in response a SIP response message is sent from the destination element to the source element, the system being arranged such that messages are sent via the apparatus for forwarding to an appropriate destination, and wherein the intermediate element is a SIP proxy server, comprising:

means for, prior to forwarding a received SIP request message that includes a URI of the SIP proxy server, determining in the received SIP request message a presence of a SIP compression parameter, said means being arranged for, where the presence of a SIP compression parameter is found, adding a temporary identifier associated with the SIP proxy server to a field including the URI of the SIP proxy server in the received SIP request message such that the temporary identifier is included in the corresponding SIP response message; and means for, prior to forwarding a received SIP response message, determining in the received SIP response message a presence of a temporary identifier associated with the SIP proxy server in a field including the URI of the SIP proxy server, said means being arranged for, where the presence of the temporary identifier is found, replacing the temporary identifier with a SIP compression parameter.

* * * * *

UNITED STATES PATENT AND TRADEMARK OFFICE
CERTIFICATE OF CORRECTION

PATENT NO. : 7,885,284 B2
APPLICATION NO. : 11/587570
DATED : February 8, 2011
INVENTOR(S) : David Mansutti et al.

Page 1 of 1

It is certified that error appears in the above-identified patent and that said Letters Patent is hereby corrected as shown below:

On the Title page, in Item (57), Abstract, in column 2, line 4, after "messages" delete "being".

Signed and Sealed this
Twenty-fourth Day of May, 2011

David J. Kappos
*Director of the United States Patent and Trademark Office*